(12) United States Patent
Li (10) Patent No.: US 10,748,150 B2
(45) Date of Patent: Aug. 18, 2020

(54) METHOD AND APPARATUS FOR PROCESSING TRANSACTION REQUESTS

(71) Applicant: ALIBABA GROUP HOLDING LIMITED, Grand Cayman (KY)

(72) Inventor: Ning Li, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 53 days.

(21) Appl. No.: 15/927,402

(22) Filed: Mar. 21, 2018

(65) Prior Publication Data

US 2018/0285869 A1    Oct. 4, 2018

(30) Foreign Application Priority Data

Mar. 28, 2017    (CN) .......................... 2017 1 0190507

(51) Int. Cl.
*G06Q 20/40* (2012.01)
*G06Q 20/42* (2012.01)
(Continued)

(52) U.S. Cl.
CPC .......... *G06Q 20/401* (2013.01); *G06Q 20/12* (2013.01); *G06Q 20/425* (2013.01);
(Continued)

(58) Field of Classification Search
CPC . H04L 2209/38; H04L 9/3239; H04L 9/0637; H04L 2209/56; H04L 63/08;
(Continued)

(56) References Cited

U.S. PATENT DOCUMENTS

| 6,138,107 A | 10/2000 | Elgamal |
| 6,157,920 A | 12/2000 | Jakobsson et al. |

(Continued)

FOREIGN PATENT DOCUMENTS

| AU | 2016101976 A4 * | 12/2016 | ............ G06F 21/64 |
| CN | 105678182 A | 6/2016 | |

(Continued)

OTHER PUBLICATIONS

Written Opinion of the International Preliminary Examining Authority dated Feb. 26, 2019, issued in International Application No. PCT/US2018/023517 (6 pages).

(Continued)

*Primary Examiner* — Alexander G Kalinowski
*Assistant Examiner* — Sanjeev Malhotra
(74) *Attorney, Agent, or Firm* — Sheppard Mullin Richter & Hampton LLP (57) ABSTRACT

A method for processing a transaction request, implementable by a first transaction node, may comprise: acquiring transaction data of a target transaction, wherein the first transaction node participates in the target transaction; determining, according to the transaction data, a transaction abstract after a plurality of transaction nodes each sign a data abstract of the transaction data, wherein the transaction nodes comprise at least the first transaction node and one or more second transaction nodes; generating a transaction request that comprises the transaction abstract; and broadcasting the transaction request to one or more consensus nodes, causing the consensus nodes to each save the transaction abstract in the transaction request into a blockchain after the transaction abstract passes consensus verification, the consensus nodes being blockchain nodes, wherein the transaction nodes and the consensus nodes are blockchain nodes of a blockchain network.

17 Claims, 6 Drawing Sheets

(51) Int. Cl.
*H04L 9/06* (2006.01)
*H04L 9/32* (2006.01)
*G06Q 20/12* (2012.01)

(52) U.S. Cl.
CPC .......... *H04L 9/0637* (2013.01); *H04L 9/3239* (2013.01); *H04L 9/3247* (2013.01); *G06Q 2220/00* (2013.01); *H04L 2209/38* (2013.01)

(58) Field of Classification Search
CPC ... H04L 63/10; H04L 9/0643; G06Q 20/3829; G06Q 20/401; G06Q 2220/00
USPC .............................. 701/54; 340/988; 705/75
See application file for complete search history.

(56) References Cited

U.S. PATENT DOCUMENTS

| | | | |
|---|---|---|---|
| 6,401,027 B1* | 6/2002 | Xu ....................... | G08G 1/0104 340/988 |
| 9,875,510 B1 | 1/2018 | Kasper | |
| 2002/0087481 A1 | 7/2002 | Harif | |
| 2003/0233327 A1 | 12/2003 | Keresman, III et al. | |
| 2005/0065692 A1* | 3/2005 | Freitag ................... | B66D 1/485 701/54 |
| 2009/0119207 A1 | 5/2009 | Grecia | |
| 2009/0319425 A1 | 12/2009 | Tumminaro et al. | |
| 2011/0022517 A1 | 1/2011 | Hammad | |
| 2011/0313921 A1 | 12/2011 | Dheer et al. | |
| 2011/0320347 A1 | 12/2011 | Tumminaro et al. | |
| 2012/0246019 A1 | 9/2012 | Wolfe | |
| 2012/0284187 A1 | 11/2012 | Hammad et al. | |
| 2012/0317034 A1 | 12/2012 | Guha et al. | |
| 2013/0290226 A1 | 10/2013 | Dokken | |
| 2015/0262137 A1 | 9/2015 | Armstrong | |
| 2015/0363782 A1* | 12/2015 | Ronca ................. | G06Q 20/4016 705/75 |
| 2016/0292672 A1 | 10/2016 | Fay et al. | |
| 2017/0017954 A1 | 1/2017 | Mcdonough et al. | |
| 2017/0075941 A1 | 3/2017 | Finlow-bates | |
| 2018/0061237 A1* | 3/2018 | Erickson ............... | G08G 1/163 |
| 2018/0218454 A1* | 8/2018 | Simon ................... | H04L 9/3239 |
| 2018/0219676 A1* | 8/2018 | Mattingly ............. | H04L 9/3239 |
| 2018/0227275 A1* | 8/2018 | Russinovich ......... | H04L 9/3236 |
| 2018/0240114 A1* | 8/2018 | Li ......................... | H04L 9/3239 |
| 2018/0276668 A1* | 9/2018 | Li ......................... | G06Q 20/401 |

FOREIGN PATENT DOCUMENTS

| | | | | |
|---|---|---|---|---|
| CN | 105719185 | A | 6/2016 | |
| CN | 105790954 | A | 7/2016 | |
| CN | 105871545 | A | 8/2016 | |
| CN | 105975868 | A | 9/2016 | |
| CN | 105976232 | A | 9/2016 | |
| CN | 106230851 | A | 12/2016 | |
| CN | 106411503 | A | 2/2017 | |
| CN | 106487821 | A | 3/2017 | |
| CN | 106503995 | A | 3/2017 | |
| CN | 106533675 | A | 3/2017 | |
| CN | 106534273 | A | 3/2017 | |
| EP | 3054405 | A1 | 8/2016 | |
| WO | WO-2018172439 | A1 * | 9/2018 | ........... G06Q 20/382 |

OTHER PUBLICATIONS

PCT International Search Report and the Written Opinion dated Jul. 25, 2018, issued in International Application No. PCT/US2018/023517 (12 pages).

Xiwei Xu et al., "The Blockchain as a Software Connector", retrieved from the internet: URL:http://design.inf.usi.ch/sites/default/files/biblio/2016_WICSA_BlockChainSoftwareConnector.pdf [retrieved on May 25, 2016], 10 pages.

International Preliminary Report on Patentability for PCT Application No. PCT/US2018/023517 dated Jul. 25, 2019 (36 pages).

Office Action for Taiwanese Application No. 106139133 dated Apr. 15, 2019 (4 pages).

Office Action for Taiwanese Application No. 106139133 dated Aug. 20, 2019 (4 pages).

First Search for Chinese Application No. 201710190507.1 dated Oct. 30, 2019 (1 page).

First Office Action for Chinese Application No. 201710190507.1 dated Nov. 14, 2019 (12 pages).

Examination Report No. 1 dated Jan. 23, 2020, issued in related Australian Application No. 2018243625 (4 pages).

Andreas M. Antonopoulos, "Mastering Bitcoin—Unlocking Digital Cryptocurrencies", Mastering Bitcoin—Unlocking Digital Cryptocurrencies, Beijing Cambridge Farnham Köln Sebastopol Tokyo, O'Reilly Media, Dec. 20, 2014.

Office Action and Search Report for Russian Application No. 2019129089 dated Apr. 15, 2020.

* cited by examiner

METHOD AND APPARATUS FOR PROCESSING TRANSACTION REQUESTS

CROSS REFERENCE TO RELATED APPLICATIONS

The present application is based on and claims priority to the Chinese Application No. 201710190507.1, filed Mar. 28, 2017, the entire contents of which are incorporated herein by reference.

TECHNICAL FIELD

The present application relates to the field of information technologies, and in particular, to methods and systems for processing transaction requests.

BACKGROUND

The blockchain network, also known as the distributed ledger network, is characterized by decentralization, openness, and transparency. A blockchain network comprises blockchain nodes each capable of initiating a transaction request and participating in consensus verification on a transaction request. All blockchain nodes are synchronized with the blockchain.

An existing method to process a transaction request is as follows: with respect to a transaction, a blockchain node that participates in this transaction broadcasts a transaction request for this transaction to all consensus nodes (blockchain nodes in charge of consensus verification) in the blockchain network, the transaction request comprising transaction data of this transaction. The transaction data is saved into the blockchain after the transaction data passes consensus verification by all the consensus nodes.

However, since all the consensus nodes can synchronize with the blockchain to obtain transaction data of each transaction stored on the blockchain, it easily leads to leakage of the privacy of some blockchain nodes participating in transactions and that is comprised in the transaction data. Moreover, even if the transaction data stored on a blockchain are encrypted, there is still a risk that the encrypted transaction data can be decrypted.

Therefore, there is a need to solve the technical problem of how to design a method for verifying a transaction request, such that there is no risk for privacy breach of a blockchain node participating in the transaction.

SUMMARY

Embodiments of the present application provide methods and systems for processing transaction requests to solve the privacy breach problem of the existing method to process transaction requests.

According to one aspect, a method for processing a transaction request implementable by a first transaction node may comprise: acquiring transaction data of a target transaction, wherein the first transaction node participates in the target transaction; determining, according to the transaction data, a transaction abstract after a plurality of transaction nodes each sign a data abstract of the transaction data, wherein the transaction nodes comprise at least the first transaction node and one or more second transaction nodes; generating a transaction request that comprises the transaction abstract; and broadcasting the transaction request to one or more consensus nodes, causing the consensus nodes to each save the transaction abstract in the transaction request into a blockchain after the transaction abstract passes consensus verification, the consensus nodes being blockchain nodes, wherein the transaction nodes and the consensus nodes are blockchain nodes of a blockchain network. The one or more transaction nodes may or may not comprise the first transaction node. The consensus nodes and the one or more transaction nodes may or may not overlap.

According to another aspect, an apparatus for processing a transaction request may comprise: an acquiring module configured to acquire transaction data of a target transaction; a determining module configured to determine, according to the transaction data, a transaction abstract, the transaction abstract being obtained after all transaction nodes sign a data abstract of the transaction data, the transaction nodes being blockchain nodes that participate in the target transaction, and the apparatus being one of the transaction nodes; a generating module configured to generate a transaction request that comprises the transaction data and the transaction abstract; and a broadcasting module configured to broadcast the transaction request to all consensus nodes, such that all the consensus nodes save the transaction abstract in the transaction request into a blockchain after the transaction abstract passes consensus verification.

According to another aspect, a non-transitory computer-readable storage medium may store instructions that, when executed by a processor of a first transaction node, cause the processor to perform a method for processing a transaction request. The method may comprise: acquiring transaction data of a target transaction, wherein the first transaction node participates in the target transaction; determining, according to the transaction data, a transaction abstract after a plurality of transaction nodes each sign a data abstract of the transaction data, wherein the transaction nodes comprise at least the first transaction node and one or more second transaction nodes; generating a transaction request that comprises the transaction abstract; and broadcasting the transaction request to one or more consensus nodes, causing the consensus nodes to each save the transaction abstract in the transaction request into a blockchain after the transaction abstract passes consensus verification, the consensus nodes being blockchain nodes, wherein the transaction nodes and the consensus nodes are blockchain nodes of a blockchain network.

According to another aspect, an apparatus, implementable as a first transaction node, may comprise a processor and a non-transitory computer readable storage medium storing instructions that, when executed by the processor, cause the apparatus to perform a method for processing a transaction request. The method may comprise: acquiring transaction data of a target transaction, wherein the first transaction node participates in the target transaction; determining, according to the transaction data, a transaction abstract after a plurality of transaction nodes each sign a data abstract of the transaction data, wherein the transaction nodes comprise at least the first transaction node and one or more second transaction nodes; generating a transaction request that comprises the transaction abstract; and broadcasting the transaction request to one or more consensus nodes, causing the consensus nodes to each save the transaction abstract in the transaction request into a blockchain after the transaction abstract passes consensus verification, the consensus nodes being blockchain nodes, wherein the transaction nodes and the consensus nodes are blockchain nodes of a blockchain network.

According to another aspect, a method for processing a transaction request, implementable by a first transaction node, may comprise: acquiring transaction data of a target transaction, the first transaction node being a blockchain node that participates in the target transaction; generating a data abstract based at least on the transaction data; transmitting the data abstract to one or more second transaction nodes, wherein a plurality of transaction nodes comprise at least the first transaction node and the second transaction nodes; obtaining a transaction abstract based at least on each of the transaction nodes signing the data abstract; generating a transaction request comprising the transaction abstract; and broadcasting the transaction request to one or more consensus nodes, causing the one or more consensus nodes to each verify the transaction abstract in the transaction request, wherein the transaction nodes and the consensus nodes are blockchain nodes of a blockchain network.

In some embodiments, the first transaction node and the one or more second transaction nodes may form all transaction nodes participating in the target transaction, and the transaction data may not be transmitted to the consensus nodes and not saved into a blockchain associated with the target transaction.

In some embodiments, the transaction data of the target transaction may comprise at least one of a subject matter of a transaction associated with the target transaction, detailed information of the subject matter, an account address of a subject that participates in the target transaction, or ID information of the subject that participates in the target transaction.

In some embodiments, signing the data abstract may comprise digitally granting a verification of the data abstract, and obtaining the transaction abstract based at least on each of the first transaction node and the one or more second transaction nodes signing and returning the data abstract may comprise obtaining the transaction abstract based at least on each of the first transaction node the one or more second transaction nodes each signing the data abstract in a preset order.

According to some embodiments of the present disclosure, a transaction request broadcast by a transaction node to all consensus nodes comprises a transaction abstract, but the transaction request does not comprise transaction data. As a result, when the transaction request passes consensus verification, the consensus nodes will not save transaction data into a blockchain, and there will be no risk for the privacy of the transaction nodes to be leaked. At the same time, the transaction abstract is obtained after all transaction nodes sign the data abstract of the transaction data. As a result, even when there is no transaction data stored in the blockchain, the authenticity of the transaction request can still be proved through the data abstract recognized by all transaction nodes, such that none of the transaction nodes can deny the target transaction corresponding to the transaction request.

BRIEF DESCRIPTION OF THE DRAWINGS

To more clearly describe the technical solutions in the embodiments of the present disclosure, the accompanying drawings illustrating the embodiments or the prior art will be described briefly as follows. Apparently, the accompanying drawings in the following description are merely exemplary. To a person skilled in the art, other drawings may be further obtained according to these drawings without inventive effort.

DETAILED DESCRIPTION

The embodiments of the present disclosure provide methods and apparatuses for processing a transaction request.

To enable a person skilled in the art to better understand the technical solutions in the present disclosure, the technical solutions in the present disclosure will be clearly and completely described with reference to the accompanying drawings in the embodiments of the present application. Apparently, the described embodiments are merely some, rather than all, of the embodiments of the present disclosure. All other embodiments obtained by a person skilled in the art without inventive effort and on the basis of the embodiments of the present disclosure shall be encompassed by the present disclosure.

Figure 1:
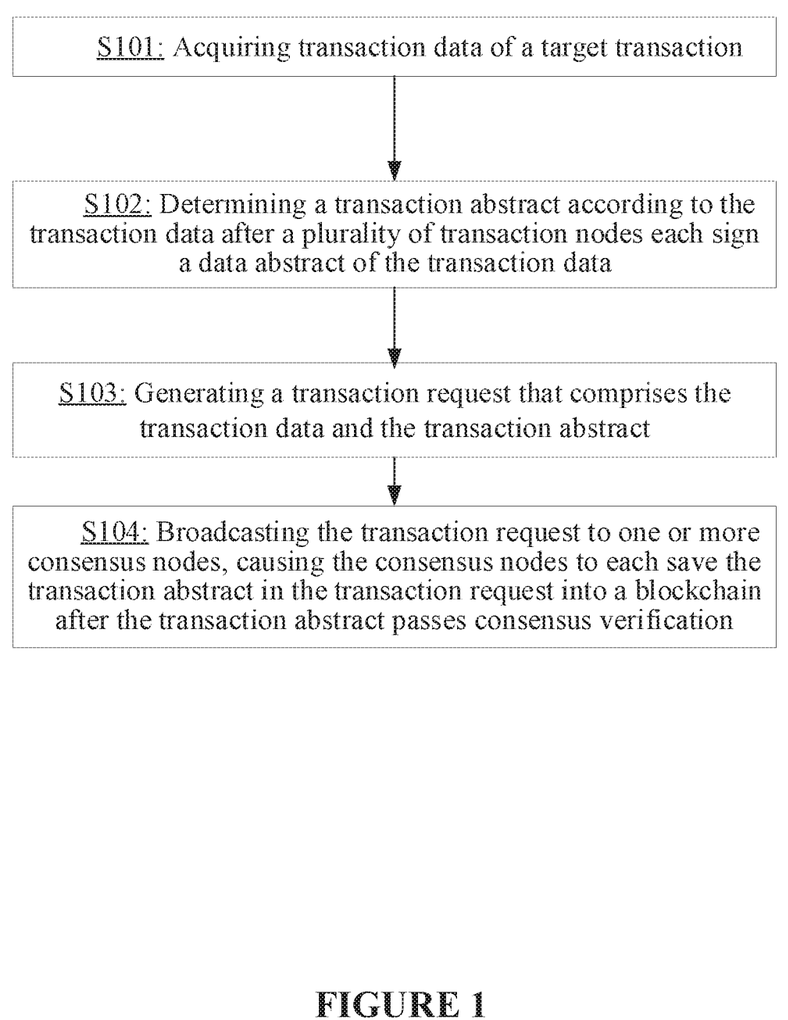
FIG. 1 is a flow chart of a method for processing a transaction request according to some embodiments of the present disclosure.

FIG. 1 is a flow chart of a method for processing a transaction request according to some embodiments of the present disclosure. The method may be implemented by a plurality of transaction nodes (or simply "nodes"). A person of ordinary skill in the art would appreciate that the transaction node may refer to a computing device (e.g., a computer, a server, etc.). When many such computing devices couple to each other (e.g., via a local network or the Internet), they can form a network of connected nodes. The method may comprise the following steps:

S101: acquiring transaction data of a target transaction.

In an embodiment of the present disclosure, a target transaction may be one of a variety of transactions that a blockchain may be involved with. Transaction data of the target transaction may comprise a subject matter of a transaction associated with the target transaction, detailed information of the subject matter, an account address of a subject that participates in the target transaction, ID information of the subject that participates in the target transaction, etc. Any data associated with the target transaction could be the transaction data. The transaction data may comprise privacy information of blockchain nodes that participate in the target transaction.

In an embodiment of the present disclosure, a transaction node is a blockchain node that participates in the target transaction, and the first transaction node and the second transaction node below are both blockchain nodes that participate in the target transaction.

In one example, with respect to a target transaction, a transaction node needs to be designated from all transaction nodes that participate in the target transaction to broadcast a transaction request for the target transaction to all consensus nodes for the consensus nodes to perform consensus verification. The transaction node that broadcasts a transaction request can be designated through consultation by all transaction nodes, or may be arbitrarily designated. The first transaction node in the present disclosure is a transaction node in charge of broadcasting the transaction request to all consensus nodes, and the second transaction node below is a transaction node other than the first transaction node.

At the same time, there is at least one transaction node that initiates the target transaction among all transaction nodes participating in the target transaction. The transaction node that initiates the target transaction determines transaction data of the target transaction and generates a data abstract of the transaction data according to the transaction data. The first transaction node may either integrate the functions of initiating the target transaction and broadcasting the transaction request (being both a transaction node that initiates the target transaction and a transaction node that broadcasts the transaction request), or be only responsible for broadcasting the transaction request (being a transaction node that only broadcasts the transaction request, while the second transaction node initiates the target transaction).

Figure 2A:
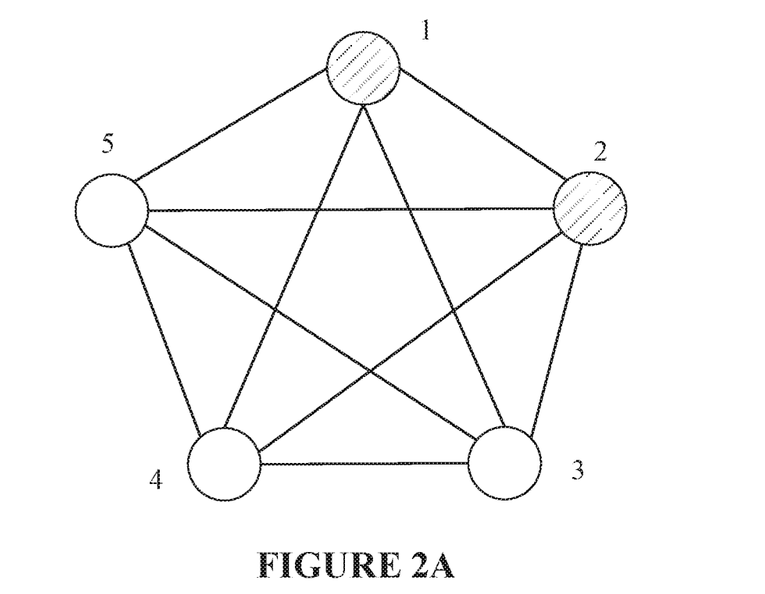
FIG. 2a is a schematic diagram of nodes in a typical blockchain network according to some embodiments of the present disclosure.

In a typical blockchain network, moreover, each blockchain node may act both as a transaction node to participate in the target transaction, and as a consensus node to simultaneously participate in consensus verification on the transaction request. FIG. 2a is a schematic diagram of nodes in a typical blockchain network according to some embodiments of the present disclosure. As shown in FIG. 2a, transaction nodes that participate in the target transaction are the node 1 and node 2 that are shaded, while the node 3, node 4, and node 5 that are not shaded do not participate in the target transaction. The node 1, node 2, node 3, node 4, and node 5 all act as consensus nodes to participate in consensus verification.

Figure 2B:
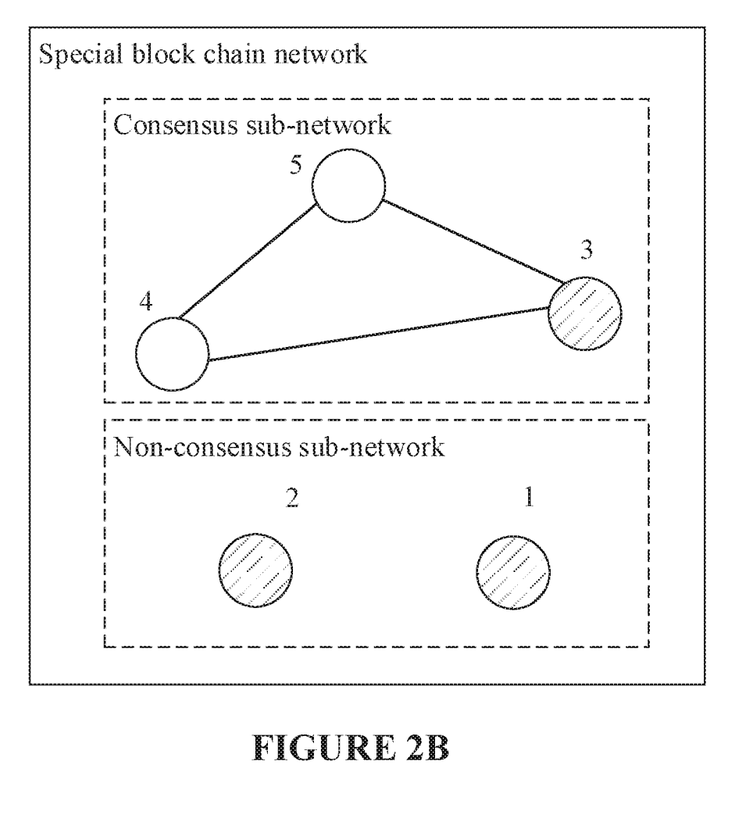
FIG. 2b is a schematic diagram of nodes in a special blockchain network according to some embodiments of the present disclosure.

In some special blockchain networks (e.g., a blockchain network including a consensus sub-network and a non-consensus sub-network), although each blockchain node may act as a transaction node to participate in the target transaction, not every blockchain node may act as a consensus node to participate in consensus verification. FIG. 2b is a schematic diagram of nodes in a special blockchain network. As shown in FIG. 2b, the blockchain network is divided into a consensus sub-network and a non-consensus sub-network. The node 1, node 2, and node 3 are transaction nodes. At the same time, the node 1 and node 2 are blockchain nodes in the non-consensus sub-network, and the node 3, node 4, and node 5 are blockchain nodes in the consensus sub-network. The consensus verification on a target transaction that the node 1, node 2, and node 3 participate in is carried out by the node 3, node 4, and node 5.

Therefore, the first transaction node may be either simultaneously a consensus node or not a consensus node. In an embodiment of the present disclosure, the first transaction node is at least a transaction node that can broadcast a transaction request of a target transaction. The first transaction node may either be a transaction node that integrates functions such as initiating a target transaction, broadcasting a transaction request, and performing consensus verification, or further be a transaction node that integrates functions such as broadcasting a transaction request and performing consensus verification, which is not limited in the present disclosure.

S102: determining a transaction abstract according to the transaction data, after a plurality of transaction nodes each sign a data abstract of the transaction data. The transaction nodes may comprise at least the first transaction node and one or more second transaction nodes.

In an embodiment of the present disclosure, the transaction abstract is obtained after all transaction nodes sign (digital signature) a data abstract of the transaction data, wherein the data abstract of the transaction data is generated by the transaction node that initiates the target transaction according to the transaction data, and moreover, plaintext transaction data cannot be obtained reversely according to the data abstract. On the other hand, even when the transaction data has a small change, the data abstract generated according to the changed transaction data will also change. The data abstract of the transaction data may be generated according to a one-way hash function, or may be generated according to other functions, as long as such the transaction data cannot be obtained reversely through the data abstract.

In an embodiment of the present disclosure, all transaction nodes can sign the data abstract to obtain a certificate abstract. The first abstract, the second abstract, the third abstract, and the abstract obtained after a plurality of transaction nodes sign the data abstract described below are all certificate abstracts. Certificate abstract is a certificate of authenticity of a data abstract recognized by a signing transaction node.

In an embodiment of the present disclosure, the transaction abstract is a final certificate abstract obtained after all transaction nodes sign the data abstract of the transaction data. In an embodiment of the present disclosure, all transaction nodes, including the first transaction node and the second transaction node, need to state that they recognize the authenticity of the data abstract by means of signature. In such a way, the authenticity of the transaction data of the target transaction can be verified by all transaction nodes before all transaction nodes perform consensus verification on the target transaction.

In some embodiments, to sign a data abstract (digital signature) is in fact to change the character structure of the data abstract, such that the signed data abstract changes to a new character string and become a certificate abstract. Moreover, if the certificate abstract is further signed by other nodes, the character structure of the certificate abstract is further changed to become a new certificate abstract. For example, a data abstract signed by 5 transaction nodes and a data abstract signed by 4 transaction nodes are completely different. Moreover, when 5 transaction nodes sign a data abstract, different transaction abstracts will be obtained if the order in which these 5 transaction nodes sign is different.

As such, in an embodiment of the present disclosure, a transaction abstract is obtained after a data abstract of the transaction data is signed by all transaction nodes. The obtained transaction abstract can undoubtedly indicate that all transaction nodes recognize the transaction data and the data abstract, i.e., recognize the authenticity of the target transaction. For example, there are 4 transaction nodes that participate in the target transaction, only 3 transaction nodes sign the data abstract, and the obtained abstract is different from a transaction abstract obtained after all 4 transaction nodes sign the data abstract due to the lack of a signature by the last transaction node. Therefore, it shows that the target transaction has not been recognized by all transaction nodes and is not reliable.

Moreover, if one of the transaction nodes does not recognize the authenticity of transaction data and a data abstract and refuses to sign the data abstract, the first transaction node is unable to determine the transaction abstract and will not broadcast a transaction request comprising a transaction abstract to all consensus nodes, which means a failure to initiate a target transaction. In a special case, if the first transaction node acts maliciously by still generating, despite that a transaction node refuses to sign the data abstract, a fake transaction abstract according to the obtained abstract (the abstract that lacks a signature from the refusing transaction node) and broadcasting the fake transaction abstract to all consensus nodes, the interest of the transaction node that refuses to sign will not be damaged even if the fake transaction abstract is saved into a blockchain. This is because the fake transaction abstract is a certificate abstract not signed by the transaction node that refuses to sign and cannot be used as a certificate of a statement that the transaction node that refuses to sign recognizes the target transaction. Therefore, requiring multiple signatures on a data abstract not only can prevent a malicious node from making up transaction data, but also can prevent a malicious node from intentionally damaging interests of other blockchain nodes (a blockchain node does not need to be responsible for a target transaction corresponding to a data abstract that the blockchain node did not sign).

In an embodiment of the present disclosure, transaction data is not broadcast to all consensus nodes for consensus verification. Instead, a transaction abstract may be broadcast to all consensus nodes for consensus verification and the consensus nodes may save the transaction abstract into a blockchain, which can ensure that the target transaction corresponding to the transaction abstract in the blockchain is authentic.

In view of the above, in some embodiments of the present disclosure, transaction data is not broadcast to all consensus nodes for consensus verification, and thus there will be no risk of privacy leakage as the transaction data will not be saved into a blockchain. If transaction data is merely not sent to consensus nodes such that the consensus nodes cannot verify authenticity of a target transaction, a transaction node that initiates the target transaction cannot be prevented from acting maliciously, making up false transactions, and damaging interests of other blockchain nodes.

To this end, in some embodiments of the present disclosure, all transaction nodes that participate in a target transaction are required to sign a data abstract of transaction data (multiple digital signature). This is equivalent to transferring the job of verifying whether the target transaction is authentic to all transaction nodes that participate in the target transaction to complete. In such a way, there is no need to have consensus nodes that verify the authenticity of a transaction request. Naturally, there is no need to obtain transaction data of the target transaction, and the target transaction recorded on the blockchain is also authentic (since a certificate abstract signed by all transaction nodes is saved onto the blockchain).

In an embodiment of the present disclosure, there is a variety of manners in which multiple digital signatures are performed on the data abstract, such as a solution of broadcasting multiple digital signatures, a solution of ordered multiple digital signatures, etc.

Here, the solution of broadcasting multiple digital signatures may refer to that a transaction node that initiates a target transaction sends a data abstract to other transaction nodes, respectively; when all transaction nodes do not object to and sign the data abstract, and the transaction abstract can be obtained by collecting the data abstracts signed by each transaction node (including the abstract obtained after signing by transaction node itself on the data abstract) and combined according to a specific algorithm.

The solution of ordered multiple digital signatures means that a transaction node that initiates a target transaction generates the data abstract, then all transaction nodes sign the data abstract in an agreed order, and the transaction node that is the last to sign or another selected transaction node determines the generated transaction abstract.

In an embodiment of the present disclosure, when the target transaction is initiated by the first transaction node, the first transaction node can generate the data abstract according to the transaction data; send the data abstract to all second transaction nodes and to cause all the second transaction nodes to sign the data abstract; acquire the abstract after all the second transaction nodes sign the data abstract; determine the transaction abstract according to the acquired signed data abstract, wherein the second transaction nodes may be transaction nodes other than the first transaction node in all transaction nodes.

For example, when the target transaction is initiated by the first transaction node, the solution of broadcasting multiple digital signatures can be used, wherein the first transaction node generates the data abstract according to the transaction data and signs the data abstract to obtain a third abstract, sends the third abstract to all second transaction nodes for signature, respectively, then combines abstracts generated after all the second transaction nodes sign the third abstract, and determines the transaction abstract; similarly, when the solution of broadcasting multiple digital signatures is used, the first transaction node can first send the data abstract to all second transaction nodes, respectively, then sign the data abstract to obtain a third abstract, and lastly combine abstracts generated after all the second transaction nodes sign the data abstract and the third abstract to obtain the transaction abstract.

In some embodiments, when the target transaction is initiated by the first transaction node, the solution of ordered multiple digital signatures may also be used, which will not be repeated.

In an embodiment of the present disclosure, when the target transaction is initiated by any second transaction node, the first transaction node can receive the data abstract sent by the second transaction node that initiates the target transaction, and after verifying the data abstract to be correct, can sign the data abstract to obtain a first abstract; upon receiving second abstracts obtained after all the second transaction nodes sign the data abstract, determine the transaction abstract according to the first abstract and the second abstracts.

In summary, the present disclosure does not limit the method with which the first transaction node determines the transaction abstract according to transaction data. The first transaction node, as a transaction node that initiates a target transaction and broadcasts a transaction request, may determine a transaction abstract in a variety of multiple signature solutions, or merely as a transaction node that broadcasts a transaction request, may obtain a transaction abstract.

S103: generating a transaction request that comprises the transaction data and the transaction abstract.

S104: broadcasting the transaction request to one or more consensus nodes, causing the consensus nodes to each save the transaction abstract in the transaction request into a blockchain after the transaction abstract passes consensus verification. The transaction nodes and the consensus nodes are blockchain nodes of a blockchain network.

In some embodiments, the transaction request broadcast by the first transaction node to all consensus nodes comprises the transaction abstract, but does not comprise transaction data.

In some embodiments, after the consensus verification on a transaction abstract in the transaction request is passed, each consensus node may only save the transaction abstract into the blockchain and does not save transaction data into the blockchain. In an embodiment of the present disclosure, each consensus node may just need to verify the validity of the transaction abstract comprised in the transaction request, e.g., by using a public key provided by each transaction node to attempt decryption of the transaction abstract. If the decryption is successful, it shows that the transaction abstract is indeed obtained after all transaction nodes sign the data abstract of the transaction data, and also shows that the target transaction corresponding to the transaction request has been unanimously recognized by all transaction nodes and is authentic. The public key provided by each transaction node could be either provided by each transaction node to a consensus node in advance, or sent to a consensus node together with the transaction request sent by the first transaction node to the consensus node.

For a target transaction, as long as a blockchain stores a transaction abstract determined according to the transaction data of the target transaction, it can show that the target transaction is authentic, and there is no need for all the consensus nodes to perform consensus verification on the transaction data of the target transaction.

In an embodiment of the present disclosure, the transaction request not only can comprise the transaction abstract, but also can comprise an asset number of an asset that the target transaction relates to. In addition to performing validity verification on the transaction abstract, each consensus node can carry out verification in the following two aspects according to the received asset number: 1. determining whether the asset is repeatedly spent; and 2. verifying whether the asset is fraudulently used, which is to determine asset numbers of assets owned by all transaction nodes, respectively, according to the public key of each transaction node, and then to determine whether there is at least one asset number, among the asset numbers of assets that the target asset relates to, that is not an asset number of an asset owned by the transaction nodes. If yes, it shows that a transaction node in the target transaction fraudulently uses an asset number of a non-transaction node.

In such a situation, the transaction abstract is saved into the blockchain only when it is confirmed that the transaction abstract is valid and there is no repeated spending of assets or fraudulent use of an asset number. Since the asset number does not relate to privacy of a transaction node, a consensus node can be tasked to carry out the verification of whether there is repeated spending of assets or fraudulent use of an asset number.

In an embodiment of the present disclosure, the first transaction node may further save the transaction data into a private database corresponding to itself.

Furthermore, when the target transaction is initiated by the first transaction node, the first transaction node can further send the transaction data to each second transaction node, and each second transaction node can also save the transaction data into a private database corresponding to itself.

In some embodiments, each transaction node can also save the data abstract into its own private database, which is not limited by the present disclosure.

Transaction data can reflect the whole picture of a target transaction. To prevent disputes among the transaction nodes regarding the target transaction, and to allow all the transaction nodes to query, at any time, transaction data of the target transaction that they participate in, and each transaction node can save transaction data on its own. At least one transaction node saves the transaction data to ensure that the transaction node is not lost.

In this way, provided that all transaction nodes trust a transaction abstract stored on a blockchain, the transaction data stated by each transaction node can be verified. Namely, a multiple signature solution that is the same as the one used previously when a target transaction is initiated can be used to obtain multiple signatures on transaction data stated by a transaction node to determine if a transaction abstract stored on a blockchain can be obtained.

In other words, the transaction data stored by each transaction node on its own can be arbitrarily changed by each transaction node. Assuming that the transaction data stored by all the transaction nodes are not consistent (some transaction nodes act maliciously), each transaction node can, according to the to-be-verified transaction data stated by a transaction node (which may be made up by the transaction node itself), re-obtain a to-be-verified transaction abstract corresponding to the to-be-verified transaction data using the multiple digital signature solution used before. If the to-be-verified transaction abstract is the same as the transaction abstract stored in the blockchain, the transaction node does not act maliciously; otherwise, the transaction node may act maliciously.

Figure 3A:
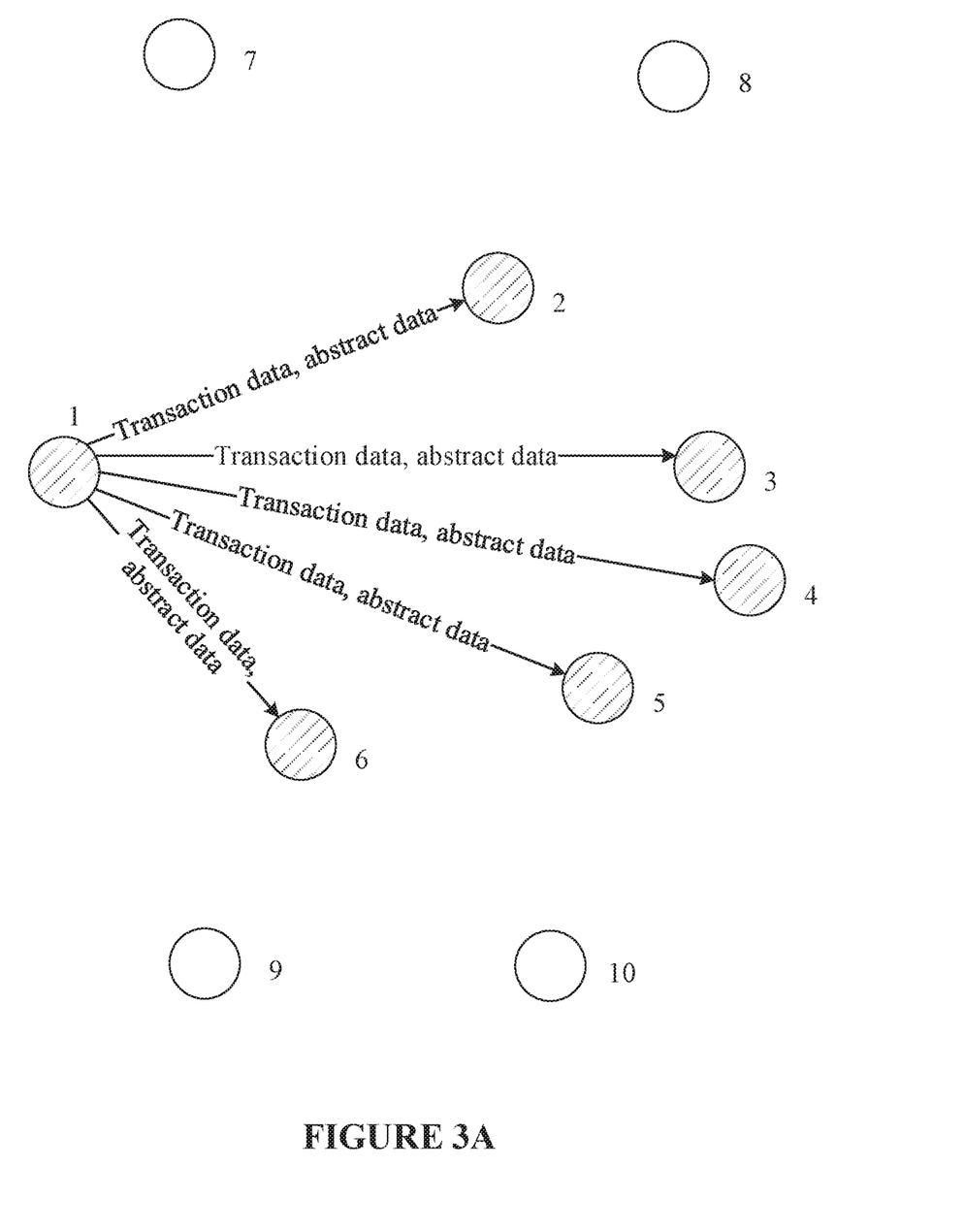
FIGS. 3a-c are schematic diagrams of a method for processing a transaction request according to some embodiments of the present disclosure.
Figure 3B:
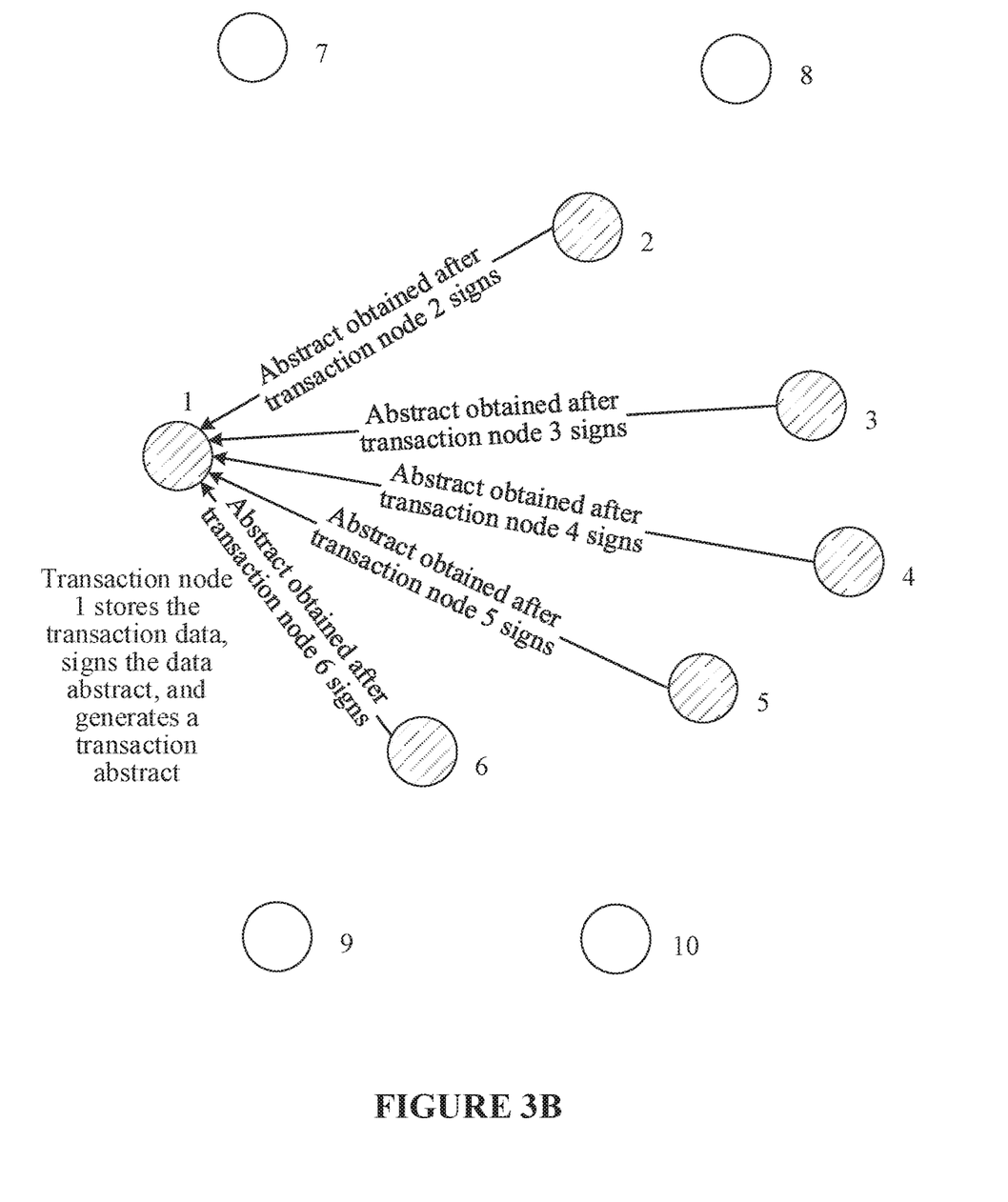
Figure 3C:
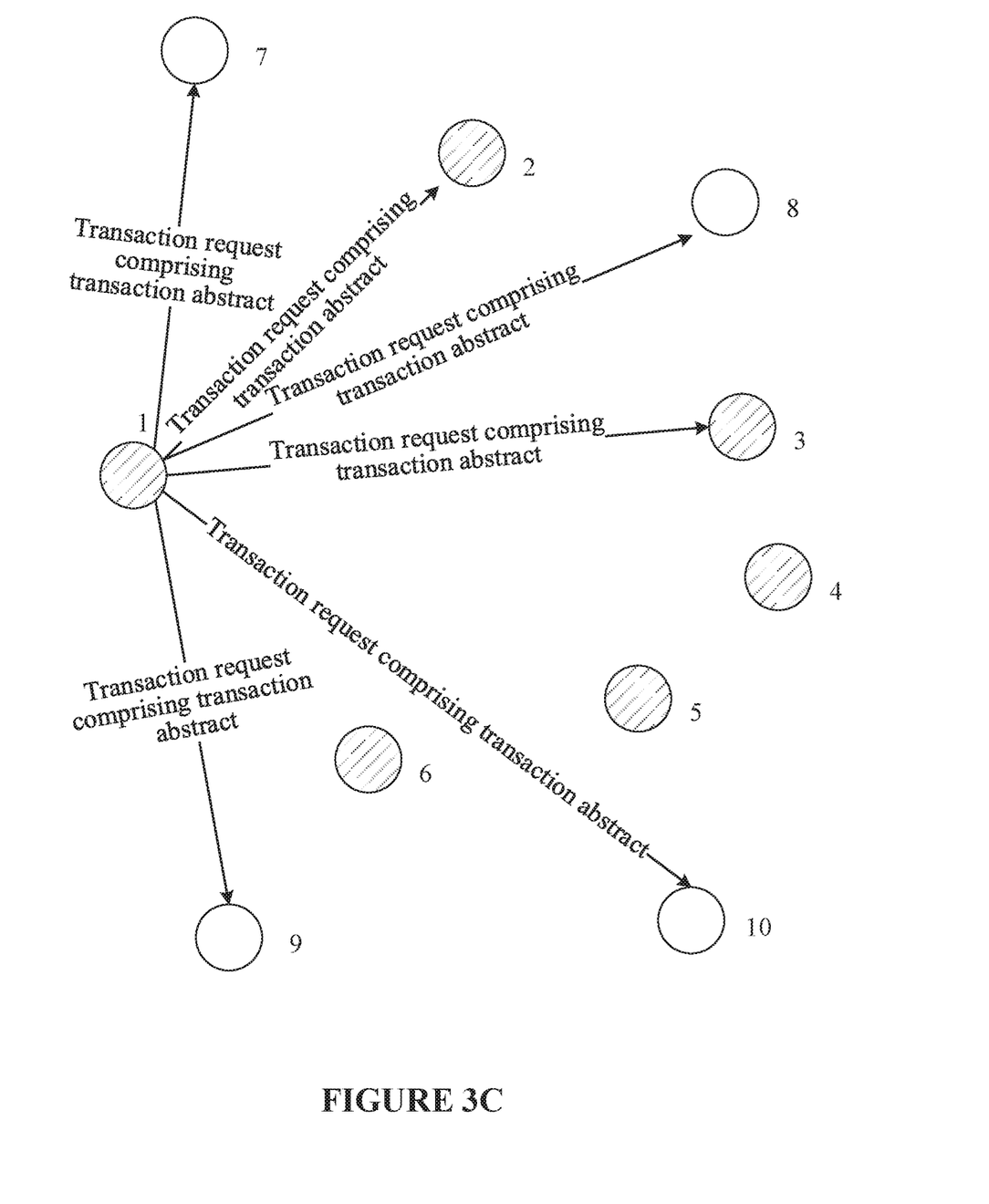

FIGS. 3*a*-*c* are schematic diagrams of a method for processing a transaction request according to some embodiments of the present disclosure. As shown in FIGS. 3*a*-*c*, the blockchain network comprises blockchain nodes 1-10, wherein the shaded blockchain nodes 1-6 are transaction nodes, and the blockchain nodes 1-3 and 7-10 are consensus nodes. The transaction node 1 is a transaction node that initiates a target transaction, as well as a transaction node that broadcasts a transaction request. As shown in FIG. 3*a*, the transaction node 1 acquires transaction data and generates a data abstract according to the transaction data, and subsequently sends the transaction data and the data abstract to the transaction nodes 2-6, such that they sign the data abstract, respectively. As shown in FIG. 3*b*, the transaction nodes 2-6 can store the transaction data into their own private databases, and return, after the data abstract and the transaction data are verified to be correct, the abstract obtained after the data abstract is signed to the transaction node 1. On one hand, the transaction node 1 saves the transaction data into the blockchain nodes; on the other hand, the transaction node 1 signs the data abstract itself, and at last, determines a transaction abstract according to the received abstracts from other transaction nodes and the abstract obtained after it signs the data abstract itself. As shown in FIG. 3*c*, after determining the transaction abstract, the transaction node 1 generates a data request that comprises the transaction abstract and broadcasts it to each consensus node for consensus verification. If the data request passes the verification, each consensus node saves the transaction abstract into the blockchain.

The method for processing a transaction request shown in FIGS. 3*a*-*c* is just an exemplary implementation of the technical solution of the present disclosure. In an embodiment of the present disclosure, whether the first transaction node is a node that initiates a target transaction is not limited, whether each transaction node is a consensus node is not limited, and what multiple digital signature solution is used and what algorithm is used to combine the abstract obtained after all transaction nodes sign the data abstract into a transaction abstract are not limited, either.

By the method for processing a transaction request shown in FIG. 1, a transaction request broadcast by a transaction node to all consensus nodes comprises a transaction abstract, but the transaction request does not comprise transaction data. As a result, when the transaction request passes consensus verification, the consensus nodes will not save transaction data into a blockchain, and there will be no risk for the privacy of the transaction nodes to be leaked. At the same time, the transaction abstract is obtained after all transaction nodes sign the data abstract of the transaction data. As a result, even when there is no transaction data stored in the blockchain, the authenticity of the transaction request can still be proved through the data abstract recognized by all transaction nodes, such that none of the transaction nodes can deny the target transaction corresponding to the transaction request.

In some blockchain application scenarios, moreover, some monitoring mechanisms need to be introduced into a blockchain network as monitoring nodes. The certificate abstracts corresponding to target transactions and stored in a blockchain have multiple digital signatures, and can facilitate a monitoring node to learn which transaction nodes participate in a target transaction and whether a target transaction has been unanimously recognized by all transaction nodes that participate in this target transaction.

Figure 4:
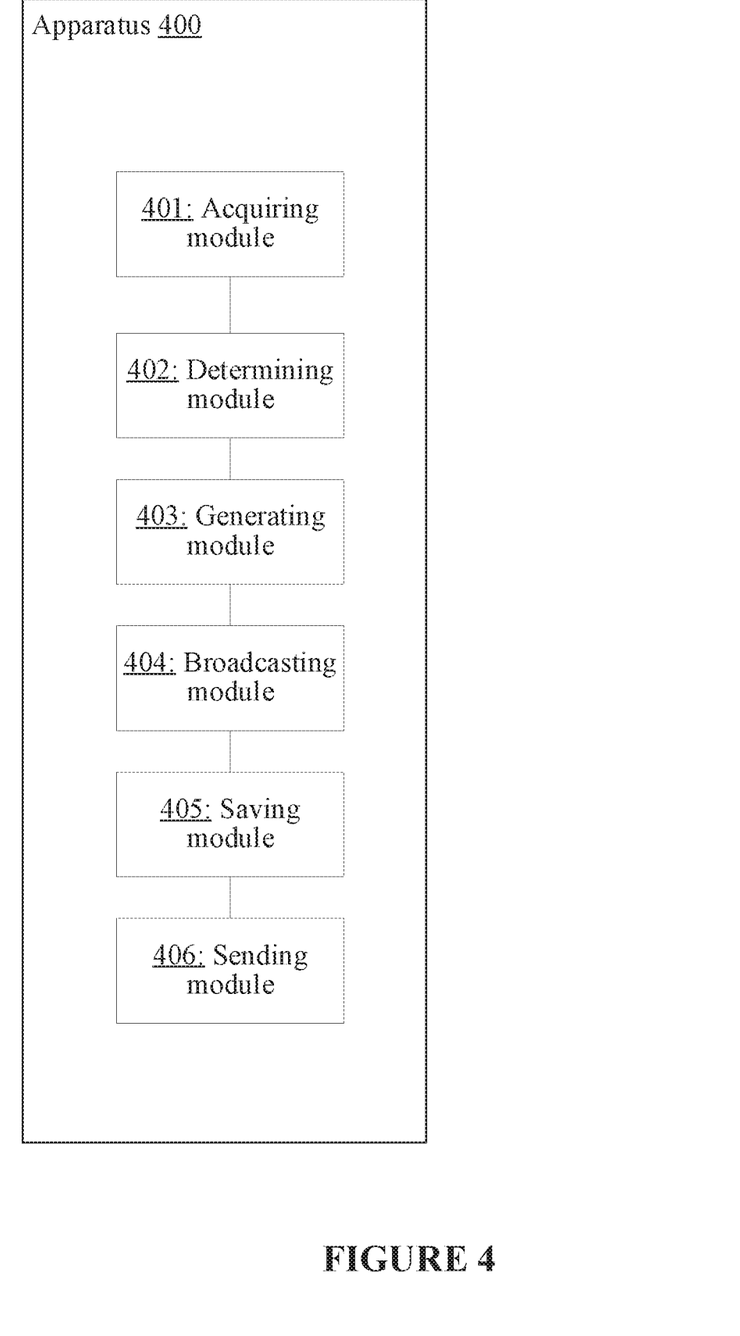
FIG. 4 is a schematic diagram of an apparatus for processing a transaction request according to some embodiments of the present disclosure.

On the basis of the method for processing a transaction request shown in FIG. 1, an embodiment of the present disclosure further correspondingly provides an apparatus 400 for processing a transaction request, as shown in FIG. 4. The apparatus 400 may be implemented as software, hardware, or a combination of both. In one example, the apparatus 400 may comprise a processor and a memory coupled together. The memory may be non-transitory and computer-readable and may store instructions that, when executed by the processor, cause the apparatus 400 to perform various steps and methods described herein. The instructions may be implemented as various modules, comprising:

an acquiring module 401 configured to acquire transaction data of a target transaction;

a determining module 402 configured to determine, according to the transaction data, a transaction abstract, the transaction abstract being obtained after all transaction nodes sign a data abstract of the transaction data, the transaction nodes being blockchain nodes that participate in the target transaction, and the apparatus being one of the transaction nodes;

a generating module 403 configured to generate a transaction request that comprises the transaction data and the transaction abstract; and a broadcasting module 404 configured to broadcast the transaction request to all consensus nodes, such that all the consensus nodes save the transaction abstract in the transaction request into a blockchain after the transaction abstract passes consensus verification.

In some embodiments, with respect to the determining module 402, when the target transaction is initiated by the apparatus, the apparatus 400 generates the data abstract according to the transaction data; sends the data abstract to all second transaction nodes, such that all the second transaction nodes sign the data abstract; acquires the data abstract after all the second transaction nodes sign the data abstract; and determines the transaction abstract according to the acquired signed data abstract.

In some embodiments, when the target transaction is initiated by any second transaction node, the determining module 402 receives the data abstract; verifies the data abstract according to the transaction data; signs, if the data abstract passes the verification, the data abstract to obtain a first abstract; and upon receiving second abstracts obtained after all the second transaction nodes sign the data abstract, determines the transaction abstract according to the first abstract and the second abstracts.

The apparatus 400 may further comprise: a saving module 405 configured to save the transaction data into a private database corresponding to the apparatus.

The apparatus 400 may further comprise: a sending module 406 configured to send, when the target transaction is initiated by the apparatus, the transaction data to all second transaction nodes, such that each second transaction node saves the transaction data into a private database corresponding to the second transaction node.

In the 1990s, an improvement to a technology could be differentiated into a hardware improvement (e.g. an improvement to a circuit structure, such as a diode, a transistor, a switch, and the like) or a software improvement (an improvement to a flow of a method). Along with the technological development, however, many current improvements to method flows can be deemed as direct improvements to hardware circuit structures. Designers can obtain a corresponding hardware circuit structure by programming an improved method flow into a hardware circuit. Therefore, an improvement to a method flow can be realized by hardware implementation. For example, Programmable Logic Device (PLD) (e.g. Field Programmable Gate Array (FPGA)) is such an integrated circuit that its logic functions are determined by a user through programming the device. A designer can program to "integrate" a digital system onto one piece of PLD, without asking a chip manufacturer to design and manufacture a dedicated IC chip. At present, this type of programming has mostly been implemented through "logic compiler" software, rather than manually manufacturing the IC chips. The logic compiler software is similar to a software compiler used for program development and writing, while a particular programming language is used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language). The most commonly used HDL includes VHDL (Very-High-Speed Integrated Circuit Hardware Description Language) and Verilog. A person skilled in the art would have known obtaining a hardware circuit to implement a logic method flow by using the above HDLs to perform some logic programming on the method flow and program it into an IC.

A controller may be implemented in any proper manner. For example, a controller may be in, for example, a form of a microprocessor or processor, as well as a computer readable medium that stores computer readable program codes (e.g., software or firmware) capable of being executed by the (micro)processor, a logic gate, a switch, an Application Specific Integrated Circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. A memory controller may further be implemented as a part of a control logic of a memory. A person skilled in the art should also be aware that, in addition to that a controller is implemented in a manner of pure computer readable program codes, it is feasible to perform logic programming on steps of a method to enable a controller to implement the same functions in a form of a logic gate, a switch, an ASIC, a programmable logic controller and an embedded microcontroller. Therefore, such a controller can be deemed as a hardware part, while devices comprised therein and configured to carry out various functions may also be deemed as a structure inside the hardware part. Alternatively, devices configured to carry out various functions may be deemed as both software modules to implement a method and a structure inside a hardware part.

The system, apparatus, module, or unit described in the above embodiments may be implemented by a computer chip or entity or implemented by a product having a function. A typical implementation device is a computer. For example, a computer may be, for example, a personal computer, a laptop computer, a cellular phone, a camera phone, a smart phone, a personal digital assistant, a medium player, a navigation device, an email apparatus, a game console, a tablet computer, a wearable device or a combination of any devices in these devices.

For convenience of description, the above apparatus is divided into various units according to functions for description. Functions of the units may be implemented in one or multiple pieces of software and/or hardware when implementing the present disclosure.

A person skilled in the art should understand that the embodiments of the present disclosure may be provided as a method, a system, or a computer program product. Therefore, the disclosed system may be implemented as a complete hardware embodiment, a complete software embodiment, or an embodiment combing software and hardware for performing the disclosed methods. Moreover, the disclosed system may be in the form of a computer program product implemented on one or more computer usable storage media (including, but not limited to, a magnetic disk memory, CD-ROM, an optical memory, and the like) comprising computer usable program codes therein.

The disclosed system is described with reference to flowcharts and/or block diagrams of the method, device (system) and computer program product according to the embodiments of the present disclosure. It should be understood that a computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, so that the instructions executed by a computer or a processor of other programmable data processing devices generate an apparatus for implementing a specified function in one or more processes in the flowcharts and/or in one or more blocks in the block diagrams.

These computer program instructions may also be stored in a computer readable memory that can instruct a computer or other programmable data processing devices to work in a particular manner, such that the instructions stored in the computer readable memory generate a manufactured article that includes an instruction apparatus. The instruction apparatus implements one or more functions in one or more processes in the flowcharts and/or in one or more blocks in the block diagrams.

These computer program instructions may also be loaded onto a computer or other programmable data processing devices, such that a series of operational steps are performed on the computer or other programmable devices, thereby generating computer-implemented processing. Therefore, the instructions executed on the computer or other programmable devices provide steps for implementing one or more functions in one or more processes in the flowcharts and/or in one or more blocks in the block diagrams.

In a typical configuration, the computation device includes one or more Central Processing Units (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

It should be further noted that the terms of "including", "comprising" or any other variants thereof intend to encompass a non-exclusive inclusion, such that a process, method, commodity or device comprising a series of elements not only comprises these elements, but also comprises other elements that are not listed, or further comprises elements that are inherent to the process, method, commodity or device. When there is no further restriction, elements defined by the statement "comprising one . . . " does not exclude additional similar elements in a process, method, commodity or device that comprises the defined elements.

A person skilled in the art should understand that the embodiments of the present disclosure may be provided as a method, a system, or a computer program product. Therefore, the present disclosure may be implemented as a complete hardware embodiment, a complete software embodiment, or an embodiment combing software and hardware. Moreover, the present disclosure may be in the form of a computer program product implemented on one or more computer usable storage media (including, but not limited to, a magnetic disk memory, CD-ROM, an optical memory, and the like) including computer usable program codes.

The present disclosure may be described in a regular context of a computer executable instruction that is executed by a computer, such as a program module. In various embodiments, the program module comprises a routine, a program, an object, a component, a data structure, and the like for executing a particular task or implementing a particular abstract data type. The present disclosure may also be practiced in distributed computing environments. In these distributed computing environments, remote processing devices connected via communication networks carry out tasks. In the distributed computing environments, a program module can be located in local and remote computer storage media, including storage devices.

The embodiments in this description are described in a progressive manner with each embodiment focusing on differences from other embodiments, and the embodiments may be mutually referenced for identical or similar parts thereof. For the system embodiment, the description thereof is relatively simple as it is substantially similar to the method embodiment. The description of the method embodiment may be referenced for related parts thereof.

The embodiments of the present disclosure are merely exemplary, and are not used to limit the present disclosure.

To a person skilled in the art, the disclosed embodiments can be modified or changed in various ways. Any modification, equivalent substitution or improvement made within the spirit and principle of the present disclosure shall be encompassed by the claims of the present disclosure.

The invention claimed is:

1. A method for processing a transaction request, implementable by a first transaction node, the method comprising:
    acquiring transaction data of a target transaction that a plurality of transaction nodes participate in;
    determining a transaction abstract according to a data abstract that is generated based at least on the transaction data and that is digitally signed by all transaction nodes that participate in the target transaction, including each of the plurality of transaction nodes, wherein the transaction data cannot be obtained reversely through the data abstract, and wherein the plurality of transaction nodes comprise at least the first transaction node and one or more second transaction nodes;
    generating a transaction request that comprises the transaction abstract and does not comprise the transaction data, the transaction abstract enabling consensus verification without the transaction data; and
    broadcasting, via a blockchain network, the transaction request to consensus nodes, causing the consensus nodes to each save the transaction abstract in the transaction request into a blockchain after the transaction abstract passes the consensus verification, wherein the plurality of transaction nodes and the consensus nodes are blockchain nodes of the blockchain network; and
    wherein, when the target transaction is initiated by the first transaction node, determining the transaction abstract comprises:
        generating, by the first transaction node, the data abstract according to the transaction data;
        sending the data abstract to the one or more second transaction nodes;
        acquiring the data abstract after the second transaction nodes each digitally sign the data abstract; and
        determining the transaction abstract according to the acquired digitally signed data abstract.

2. The method according to claim 1, wherein, when the target transaction is initiated by any of the one or more second transaction nodes, determining the transaction abstract comprises:
    receiving the data abstract from the initiating second transaction node;
    verifying the data abstract according to the transaction data;
    digitally signing, if the data abstract passes the verification, the data abstract to obtain a first abstract; and
    upon receiving second abstracts obtained after the second transaction nodes each digitally sign the data abstract, determining the transaction abstract according to the first abstract and the second abstracts.

3. The method according to claim 1, further comprising:
    saving the transaction data into a private database corresponding to the first transaction node.

4. The method according to claim 3, wherein the target transaction is initiated by the first transaction node, and the method further comprising:
    sending the transaction data to the one or more second transaction nodes, causing each of the second transaction nodes to save the transaction data into a private database corresponding to the second transaction node.

5. A non-transitory computer-readable storage medium storing instructions that, when executed by a processor of a first transaction node, cause the processor to perform a method for processing a transaction request, the method comprising:
    acquiring transaction data of a target transaction that a plurality of transaction nodes participate in;
    determining a transaction abstract according to a data abstract that is generated based at least on the transaction data and that is digitally signed by all transaction nodes that participate in the target transaction, including each of the plurality of transaction nodes, wherein the transaction data cannot be obtained reversely through the data abstract, and wherein the plurality of transaction nodes comprise at least the first transaction node and one or more second transaction nodes;
    generating a transaction request that comprises the transaction abstract and does not comprise the transaction data, the transaction abstract enabling consensus verification without the transaction data; and
    broadcasting, via a blockchain network, the transaction request to consensus nodes, causing the consensus nodes to each save the transaction abstract in the transaction request into a blockchain after the transaction abstract passes the consensus verification, wherein the plurality of transaction nodes and the consensus nodes are blockchain nodes of the blockchain network; and
    wherein, when the target transaction is initiated by the first transaction node, determining the transaction abstract comprises:
        generating, by the first transaction node, the data abstract according to the transaction data;
        sending the data abstract to the one or more second transaction nodes;
        acquiring the data abstract after the second transaction nodes each digitally sign the data abstract; and
        determining the transaction abstract according to the acquired digitally signed data abstract.

6. The non-transitory computer-readable storage medium according to claim 5, wherein, when the target transaction is initiated by any of the one or more second transaction nodes, determining the transaction abstract comprises:
    receiving the data abstract from the initiating second transaction node;
    verifying the data abstract according to the transaction data;
    digitally signing, if the data abstract passes the verification, the data abstract to obtain a first abstract; and
    upon receiving second abstracts obtained after the second transaction nodes each digitally sign the data abstract, determining the transaction abstract according to the first abstract and the second abstracts.

7. The non-transitory computer-readable storage medium according to claim 5, wherein the method further comprises:
    saving the transaction data into a private database corresponding to the first transaction node.

8. The non-transitory computer-readable storage medium according to claim 7, wherein, when the target transaction is initiated by the first transaction node, the method further comprises:
    sending the transaction data to the one or more second transaction nodes, causing each of the second transaction nodes to save the transaction data into a private database corresponding to the second transaction node.

9. An apparatus, implementable as a first transaction node, comprising a processor and a non-transitory computer readable storage medium storing instructions that, when executed by the processor, cause the apparatus to perform a method for processing a transaction request, the method comprising:

acquiring transaction data of a target transaction that a plurality of transaction nodes participate in;

determining a transaction abstract according to a data abstract that is generated based at least on the transaction data and that is digitally signed by all transaction nodes that participate in the target transaction, including each of the plurality of transaction nodes, wherein the transaction data cannot be obtained reversely through the data abstract, and wherein the plurality of transaction nodes comprise at least the first transaction node and one or more second transaction nodes;

generating a transaction request that comprises the transaction abstract and does not comprise the transaction data, the transaction abstract enabling consensus verification without the transaction data; and broadcasting, via a blockchain network, the transaction request to consensus nodes, causing the consensus nodes to each save the transaction abstract in the transaction request into a blockchain after the transaction abstract passes the consensus verification, wherein the plurality of transaction nodes and the consensus nodes are blockchain nodes of the blockchain network; and wherein, when the target transaction is initiated by the first transaction node, determining the transaction abstract comprises:

generating, by the first transaction node, the data abstract according to the transaction data;

sending the data abstract to the one or more second transaction nodes;

acquiring the data abstract after the second transaction nodes each digitally sign the data abstract; and determining the transaction abstract according to the acquired digitally signed data abstract.

10. The apparatus according to claim 9, wherein, when the target transaction is initiated by any of the one or more second transaction nodes, determining the transaction abstract comprises:

receiving the data abstract from the initiating second transaction node;

verifying the data abstract according to the transaction data;

digitally signing, if the data abstract passes the verification, the data abstract to obtain a first abstract; and upon receiving second abstracts obtained after the second transaction nodes each digitally sign the data abstract, determining the transaction abstract according to the first abstract and the second abstracts.

11. The apparatus according to claim 9, wherein the method further comprises:

saving the transaction data into a private database corresponding to the first transaction node.

12. The apparatus according to claim 11, wherein, when the target transaction is initiated by the first transaction node, the method further comprises:

sending the transaction data to the one or more second transaction nodes, causing each of the second transaction nodes to save the transaction data into a private database corresponding to the second transaction node.

13. A method for processing a transaction request, implementable by a first transaction node, the method comprising:

acquiring transaction data of a target transaction that a plurality of transaction nodes participate in, the plurality of transaction nodes comprising the first transaction node and one or more second transaction nodes;

generating a data abstract based at least on the transaction data, wherein the transaction data cannot be obtained reversely through the data abstract;

transmitting the data abstract to the one or more second transaction nodes;

acquiring the data abstract after the second transaction nodes each digitally sign the data abstract;

determining the transaction abstract according to the acquired digitally signed data abstract;

generating a transaction request comprising the transaction abstract and not comprising the transaction data, the transaction abstract enabling consensus verification without the transaction data; and broadcasting, via a blockchain network, the transaction request to consensus nodes, causing the consensus nodes to each verify the transaction abstract in the transaction request, wherein the plurality of transaction nodes and the consensus nodes are blockchain nodes of the blockchain network.

14. The method of claim 13, wherein:
the transaction data is not transmitted to the consensus nodes and not saved into a blockchain associated with the target transaction.

15. The method of claim 13, wherein:
the transaction data of the target transaction comprises at least one of a subject matter of a transaction associated with the target transaction, detailed information of the subject matter, an account address of a subject that participates in the target transaction, or ID information of the subject that participates in the target transaction.

16. The method of claim 13, wherein:
digitally signing the data abstract comprises digitally granting a verification of the data abstract; and
obtaining the transaction abstract comprises each of the first transaction node and the one or more second transaction nodes digitally signing the data abstract in a preset order.

17. The method of claim 13, further comprising:
causing the consensus nodes to each save the transaction abstract into a blockchain associated with the target transaction in response to all of the consensus nodes having verified the transaction abstract.

* * * * *